W. M. JACKSON.

FERRULE.

No. 11,114. Reissued Oct. 7, 1890.

Witnesses
E. Mottinghaus
R. S. Ferguson.

Inventor
Walter M. Jackson.

By his Attorney
H. A. Seymour.

THE NORRIS PETERS CO., PHOTO-LITHO., WASHINGTON, D. C.

UNITED STATES PATENT OFFICE.

WALTER MARSH JACKSON, OF NEW YORK, N. Y.

FERRULE.

SPECIFICATION forming part of Reissued Letters Patent No. 11,114, dated October 7, 1890.

Original No. 392,271, dated November 6, 1888. Application for reissue filed December 11, 1888. Serial No. 293,304.

*To all whom it may concern:*

Be it known that I, WALTER MARSH JACKSON, a resident of New York city, in the county of New York and State of New York, have invented certain new and useful Improvements in Ferrules for Umbrella-Handles and Similar Articles; and I do hereby declare the following to be a full, clear, and exact description of the invention, such as will enable others skilled in the art to which it appertains to make and use the same.

My invention relates to an improvement in ferrules, and particularly to such as are employed to protect the tip ends of the stick-handles of umbrellas or parasols.

Heretofore it has been customary to construct the metallic socket-pieces used as ferrules for umbrellas and like articles from sheet metal, which is drawn in tubular form with open ends, the ferrule being provided with a tip end which has to be affixed in place by brazing or other similar means, and in order to hold the ferrule in place a hole is punched through its side wall to receive a suitably-sized nail or brad.

There is considerable work entailed to affix the metal tips in the sheet-metal ferrules that are made as above stated, which enhances the cost of production, and the method of securing the socket or ferrule on the stick with an inserted brad or small nail is defective and lacks neatness of finish.

One of the objects of my present invention is to construct a ferrule from a single blank of sheet metal by drawing it into form through dies or other suitable mechanism, so as to produce a ferrule with a solid tip end that is integral with the side wall.

A further object is to produce a tipped ferrule from a sheet-metal blank or planchet in a manner that will afford a thick tip end, whereby it is rendered more durable at the point which is most liable to wear out.

A further object is to furnish an integrally-tipped socket or ferrule for umbrellas and like articles with an integral screw-thread at its open end, thus furnishing a neat and secure fastening for attachment of the ferrule upon the tip end of the handle-stick.

With these objects in view my invention consists in certain features of construction and combinations of parts, which will be hereinafter described, and pointed out in the claims.

Figure 1:
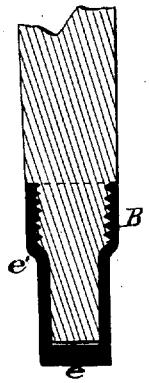
Figure 2:
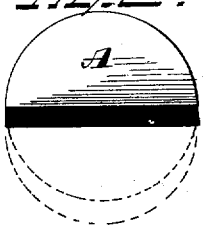

Referring to the drawings, Figure 1 is a side elevation, in section, through the axial center of the ferrule, showing it in place upon the tip end of an umbrella stick or handle. Figs. 2, 3, 4, 5, and 6 are representations of different steps in the conversion of a planchet of sheet metal into an integrally-tipped socket.

A is a disk or planchet of sheet metal of suitable thickness to afford a proper tip end to the ferrule, its diameter being proportioned to the dimension of the finished ferrule required.

Proper dies are provided, which consist of perforated plates of steel, the holes in said dies being graduated in diameter to successively draw the disk A into a cylinder by the punching of male dies that are caused to impinge upon the planchet A, suitable power-driven mechanism being employed to facilitate the rapid execution of the work.

Figure 3:
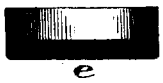

The first step in the process of converting the planchet A into a ferrule is shown in Fig. 3, in which a rimmed edge is turned upon the circular disk, and it will be seen that the portion *e* of said disk or planchet is left of the same thickness as before it engaged the first set of dies.

Figure 4:
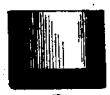
Figure 5:
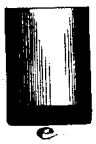
Figure 6:
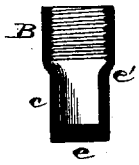

In Fig. 4 the disk is further extended into a short cylinder, in Fig. 5 it is considerably elongated by the third step in the operation, and in Fig. 6 the ferrule is shown nearly complete, the side walls being rendered comparatively thin between the lower end *c* and the offset shoulder *e'*, that is formed by the dies that effect this step in the manufacture of the ferrule.

A completed ferrule is shown in Fig. 1. The offset portion B at the open end of the ferrule is threaded internally to engage a properly-pointed handle of an umbrella, parasol, or cane, as the case may be.

As the handles of umbrellas are usually made of hard wood, if the thread in the socket or ferrule is of rather a fine pitch it will cut a corresponding thread in the wood when it is screwed upon the stick by means of a proper instrument or tool, so that when in place a secure fastening is afforded without any unsightly projections being produced on the exterior surface of the ferrule.

It will be noticed that by proper manipulation the integral tip end *e* of the finished ferrule is allowed to retain the original thickness of the planchet out of which the ferrule was drawn, thus providing a substantial wearing-surface for the tip end of the umbrella stick or handle, which is necessary, as in carrying the same it is converted into a walking-stick or cane, and thus receives considerable wear.

It is evident that the ferrule may be made of any suitable metal, and that any preferred finish may be given it. Sheet-brass or sheet-steel is preferred as a material from which to produce them.

Having fully described my invention, what I claim as new, and desire to secure by Letters Patent, is—

1. A ferrule for umbrellas and like articles, having an internal shoulder, the portion of the ferrule above said shoulder being screw-threaded internally.

2. A ferrule for umbrellas and like articles, having a closed lower end, an open upper end, and an internal shoulder located at a point between said ends, the portion of the ferrule above said shoulder being screw-threaded.

3. A ferrule formed from a single piece of metal and having a closed lower end, an open upper end, and an internal shoulder, the latter being located at a point between said ends.

4. As a new article of manufacture, a ferrule for umbrellas and like articles made from a disk of sheet metal, said ferrule having an open end and a closed end, the open end being provided with female screw-threads and the closed end forming an extended lateral bearing for the extreme end of the cane or stick, substantially as set forth.

WALTER MARSH JACKSON.

Witnesses:
GEO. T. GADEN,
GEO. M. WARD.